(No Model.)
H. L. TYLER.
ELECTRIC RAILWAY.
No. 558,238. Patented Apr. 14, 1896.
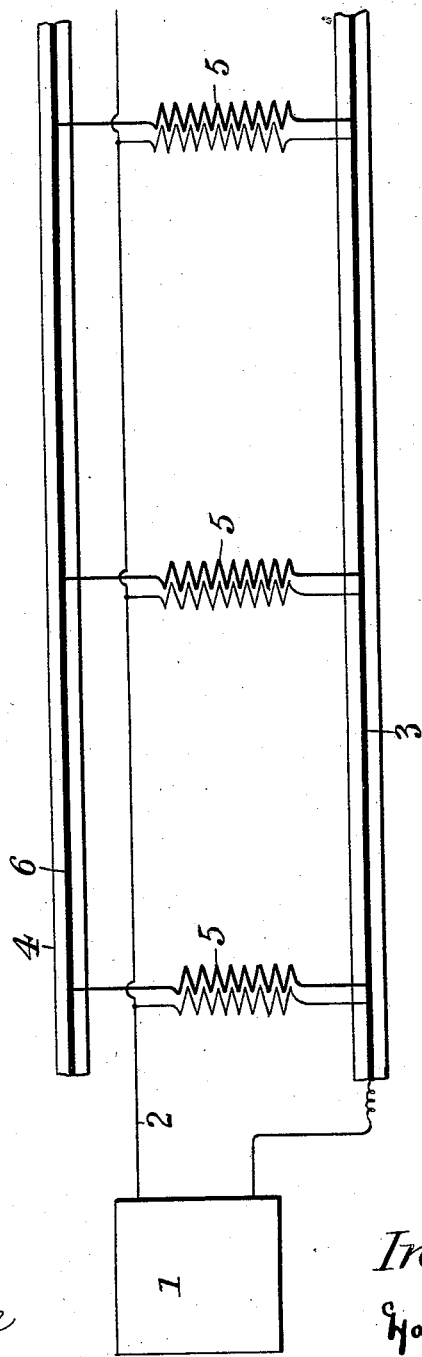
Witnesses:
John C. Pennie
Harry D. Rohrer
Inventor:
Harry L. Tyler.

UNITED STATES PATENT OFFICE.

HARRY L. TYLER, OF CORNING, NEW YORK.

ELECTRIC RAILWAY.

SPECIFICATION forming part of Letters Patent No. 558,238, dated April 14, 1896.

Application filed July 11, 1894. Serial No. 517,237. (No model.)

*To all whom it may concern:*

Be it known that I, HARRY L. TYLER, a citizen of the United States, residing at Corning, in the county of Steuben and State of New York, have invented certain new and useful Improvements in Electric Railways; and I do hereby declare the following to be a full, clear, and exact description of the invention, such as will enable others skilled in the art to which it appertains to make and use the same.

My invention relates to a system of alternating-current distribution for electric railways in which I utilize a low-potential transformed alternating current in the working circuit to supply actuating energy to the alternating low-potential motors on the cars. This transformed current is, as usual, obtained from a high-potential primary circuit extending along the line of way and fed from a suitable generator or generators at a station.

My improvement consists in utilizing the track-rails, suitably insulated and supported throughout their length, themselves as the working circuit, and at the same time employing one of the track-rails as one of the primary conductors of the high-potential inducing-circuit, thus making a part of the track act in the dual capacity of a primary and secondary conductor. By such an arrangement a material saving in the cost of conductors is attained and the resistance of the primary circuit is greatly lessened without the additional expense of special conductors.

In a practical embodiment of my invention the inducing high-potential primary current obtained from a suitable generating-station is led out by an independent conductor, suitably insulated and housed along the line of way, and the return primary conductor is one side of the track. Both track-rails are thoroughly insulated in approved forms of supports throughout their length and serve as the working or supply circuit, a suitable current-collector being provided for contact with said rails, and at the same time, as before stated, one side of this track forms one leg of the main primary inducing-circuit. The secondary or working circuit is supplied by means of a series of converters or transformers located at intervals along the line and having their secondaries connected in multiple arc with the working circuit and their primaries likewise connected in multiple arc with the main primary inducing-circuit. Thus it will be clear that a primary terminal and a secondary terminal of each transformer are connected in common to one side of the track only, while the other side is in circuit only with secondary terminals of the transformers.

In the drawings, Figure 1 illustrates my invention diagrammatically, the car, current-collector, and motor being omitted. Fig. 2 illustrates, diagrammatically, the application of the invention to a multiphase system. Fig. 3 shows the rails properly insulated, the feeding-conductors, and the transformers, all in cross-section.

Referring to the parts indicated by the numerals of reference on the drawings, 1 indicates the generating-station supplying alternating currents of high potential, and 2 is the outgoing conductor of the main primary inducing-circuit leading from said generating-station, coextensive with the line of way and laid between the tracks and suitably insulated below the surface of the road-bed. The return-leg of the main or primary circuit is formed by the side 3 of the track, said track being insulated and supported throughout its extent by the insulators 4, preferably made of vitrified brick or other indestructible insulator capable of withstanding all the strain and pounding of surface traffic.

5 5 are the converters or transformers, located at intervals along the line of way and placed in suitable boxes (not shown) in excavations under the road-bed. Each transformer 5 has a multiple-arc connection with the primary inducing-circuit by having one of its primary terminals connected with the outgoing conductor 2 and its other primary terminal in circuit with the return conductor 3, which, in this case, is one side of the track.

Both sides of the track compose the working or supply circuit for the motors on the cars, and one secondary terminal of each transformer is connected with the primary return side 3 of the track, while the other secondary terminal is connected with the other side 6 of said track.

The operation of my system is evident from an inspection of the drawings. The vehicles move along the tracks 3 and 6 and receive current from said tracks through any appropriate kind of current-collectors, which current is by them conveyed to the motors of the car, which of course are of the alternating type and are wound to receive currents of the desired tension. The track-rails are supplied, as seen from the drawings, with energy from the converters 5, which in turn receive their energy from the outgoing main primary conductor and a common return conductor, which is here shown as composed of one of the track-rails.

It will be obvious that where primary currents of high frequency or multiphase type are supplied by generators to multiphase transformers feeding a working circuit supplying actuating energy for multiphase motors this present system of distribution may be equally well employed.

Fig. 2 illustrates this modification—namely, the application of the system to a multiphase distribution. 1 indicates a multiphase generator. 2 indicates two of the outgoing primary conductors from the generator 1. 5 indicates the multiphase transformers located at appropriate places along the line. These transformers are connected with the two conductors 2 2, the third connection of the primary of the transformers being connected to the rail 3, which forms a common conductor for both the primary and secondary return-wires, as in the first figure. (Of course in a three-phase system all the primary conductors in turn form the return conductor for the primary system.) 6 indicates the other rail over which the cars move, which is connected to the other side of the secondary circuit of the transformers. 7 indicates a third surface conductor, which makes the multiphase secondary circuit complete.

Fig. 3 shows the rails 3, 6, and 7 in cross-section, with the insulators 4 protecting them from any leakage, a cross-section of one of the converters 5, and a cross-section of the feeder-wires 2, with their separating insulation and the protecting-tube in which they are placed.

Having thus fully described my invention, what I claim, and desire to secure by Letters Patent, is—

1. In a system of alternating-current electric locomotion, a suitable line of track insulated throughout its length and forming the working or secondary circuit, a main primary inducing-circuit charged with currents of high potential and consisting of an independent outgoing conductor and a return conductor formed by one side of the track, and suitable transformers located at intervals along the line of way, each having a secondary and primary terminal connected in common with the side of the track common to both the primary and working circuits, its other primary terminal connected to the outgoing independent conductor of the primary inducing-circuit, and its remaining terminal connected with the remaining side of the track.

2. A system of alternating-current electric locomotion comprising a working circuit composed of track-rails, a plurality of transformers connected in multiple arc with said working circuit, and a primary inducing-circuit charged with alternating currents of high potential and composed of an independent insulated outgoing conductor, and a return-leg formed by one side of the track or working circuit.

3. A system of alternating-current electric locomotion comprising a working circuit composed of track-rails insulated throughout their length and forming a working circuit, a plurality of transformers connected in multiple with said working circuit, and a main primary inducing-circuit charged with alternating currents of high potential, and composed of an outgoing independent conductor, and a return conductor formed by one side of the track or working circuit.

4. In a system of alternating-current electric locomotion, the combination of a source of alternating currents, an outgoing primary circuit extending therefrom, a secondary feeding-circuit extending along the line of way, a number of transformers having secondary circuits connected to the outgoing primary conductor and to a common conductor which forms the return for both the primary and secondary circuits, and vehicles moving along the way receiving current from the said secondary circuit, and motors on said vehicles which are actuated by said current.

In testimony whereof I affix my signature in presence of two witnesses.

HARRY L. TYLER.

Witnesses:
E. A. KRIGER,
LOUIS P. MILLER.